(12) United States Patent
Chauhan et al.

(10) Patent No.: US 11,537,508 B1
(45) Date of Patent: Dec. 27, 2022

(54) SOFTWARE TESTING IN PARALLEL THREADS WITH A RECORD-LOCKING DATABASE

(71) Applicant: State Farm Mutual Automobile Insurance Company, Bloomington, IL (US)

(72) Inventors: Shaktiraj Chauhan, Normal, IL (US); Nate Shepherd, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/333,535

(22) Filed: May 28, 2021

Related U.S. Application Data

(60) Provisional application No. 63/152,736, filed on Feb. 23, 2021.

(51) Int. Cl.
*G06F 9/44* (2018.01)
*G06F 11/36* (2006.01)
*G06F 16/23* (2019.01)
*G06F 8/41* (2018.01)

(52) U.S. Cl.
CPC ............ *G06F 11/3688* (2013.01); *G06F 8/44* (2013.01); *G06F 11/3684* (2013.01); *G06F 11/3692* (2013.01); *G06F 16/2343* (2019.01)

(58) Field of Classification Search
None
See application file for complete search history.

(56) References Cited

U.S. PATENT DOCUMENTS

| | | |
|---|---|---|
| 6,330,528 B1 | 12/2001 | Huang et al. |
| 8,281,187 B1 | 10/2012 | Desai et al. |
| 8,549,522 B1 | 10/2013 | Chatterjee et al. |
| 9,009,823 B1 | 4/2015 | Ismael et al. |
| 9,032,373 B1 | 5/2015 | Gupta et al. |
| 10,430,319 B1 * | 10/2019 | Tokappa ............. G06F 11/3692 |

(Continued)

OTHER PUBLICATIONS

Office Action for U.S. Appl. No. 17/333,637, dated Jun. 15, 2022, Chauhan "Retrying Failed Test Cases in Software Testing Using Parallel Threads", 18 pages.

(Continued)

*Primary Examiner* — Qamrun Nahar
(74) *Attorney, Agent, or Firm* — Lee & Hayes, P.C.

(57) ABSTRACT

Test cases written to test a software application can be dynamically distributed among different sets of test cases that can be executed simultaneously in different parallel threads, thereby speeding up testing relative to executing the test cases sequentially in a single thread. To avoid database conflicts that may occur when different test cases in different parallel threads attempt to access the same database simultaneously, testing of the software application can be performed in association with a record-locking database that locks database records individually instead of locking entire database tables or locking data structures that are larger than individual records. Locking individual database records can reduce and/or eliminate the chances that a test case in one parallel thread will be unable to access a record in the database because another test case in another parallel thread is simultaneously accessing the same database.

20 Claims, 4 Drawing Sheets

(56) References Cited

U.S. PATENT DOCUMENTS

| | | | |
|---|---|---|---|
| 2005/0120276 A1 | 6/2005 | Kolawa et al. | |
| 2007/0271483 A1 | 11/2007 | Kolawa et al. | |
| 2009/0307763 A1 | 12/2009 | Rawlins et al. | |
| 2012/0023373 A1 | 1/2012 | Chen | |
| 2016/0026562 A1 | 1/2016 | Hwang et al. | |
| 2017/0109257 A1 | 4/2017 | Li | |
| 2018/0173606 A1* | 6/2018 | Malla | G06F 11/368 |
| 2019/0332523 A1 | 10/2019 | Gefen et al. | |
| 2020/0310860 A1* | 10/2020 | Arumugam | G06F 9/542 |
| 2020/0349062 A1* | 11/2020 | Coleman | G06F 11/3688 |

OTHER PUBLICATIONS

Office Action for U.S. Appl. No. 17/333,739, dated Aug. 4, 2022, Chauhan, "Software Testing in Parallel With Different Database Instances", 12 pages.

\* cited by examiner

SOFTWARE TESTING IN PARALLEL THREADS WITH A RECORD-LOCKING DATABASE

RELATED APPLICATIONS

This U.S. Patent Application claims priority to provisional U.S. Patent Application No. 63/152,736, entitled "SOFTWARE TESTING IN PARALLEL THREADS WITH A RECORD-LOCKING DATABASE," filed on Feb. 23, 2021, the entirety of which is incorporated herein by reference.

TECHNICAL FIELD

The present disclosure relates to software development, particularly with respect to using parallel threads to perform unit and integration testing in association with a record-locking database.

BACKGROUND

During development of a software application, software developers can prepare tests to verify that the software application operates as expected. Such tests may be associated with unit testing that tests the functionality of a relatively small piece of code, and/or integration testing that tests how multiple pieces of code interact. Because individual tests may be designed to test one or more relatively small aspects of the overall software application, software developers may create numerous tests associated with the entire software application.

Some tests associated with the software application may build on one another. For instance, a first test may create a record in a database, and a second test may be designed to further access or edit the database record created by the first test. In this situation, a developer may write code for the second test under the assumption that the first test will already have executed and created the record in the database by the time the second test executes. Accordingly, in this situation, the second test may be dependent on data created by the first test.

In some situations, when a new version of the software application is tested, it can take a relatively long period of time to execute all of the tests and verify that the new version of the software application successfully passes all of the tests. For instance, tests can be written to build on each other in a sequential order as discussed above, and running a large set of tests in a sequence can take a relatively long period of time. As a non-limiting example, tests for a software application may be written in a set of 7000 class files that each include numerous functions, and it may take up to two hours to sequentially execute all of the tests in the 7000 class files.

The time it takes to sequentially execute a large set of tests can pose challenges and introduce delays during software development, particularly in situations in which multiple developers are working on the same software application. As an example, a team of software developers may generate sixty new builds of the software application in a single day. If each build is tested using a set of 7000 class files that takes up to 120 minutes of server time to execute, the testing may take up to 7200 minutes of server time in a single day.

As another example, two developers may check out code from a main code branch and independently make changes to the code for the software application. If the first developer submits updated code for testing, it may take two hours to run a full set of test cases on the first developer's updated code. However, by the time the testing verifies that the first developer's changes have passed the full set of test cases and can be incorporated back into the main code branch, the second developer may separately have submitted different code changes for testing. The code changes made by the second developer may be incompatible with the changes made by the first developer. Accordingly, even if the second developer's changes also independently pass the full set of test cases, it may not be possible to incorporate those changes back into the main code branch due to incompatible changes already made by the first developer. If testing of the first developer's code changes had been performed more quickly, the second developer could have been made aware of the first developer's changes and accounted for them before the second developer submitted additional code changes for testing.

Accordingly, it can be desirable to run a full set of tests on updated code for a software application more quickly than described above. One possibility for speeding up the testing process is to run different tests in parallel at the same time. For example, rather than running tests within a full set of 7000 class files in sequence, the tests can be divided into smaller sets that can be run simultaneously in two or more parallel threads. Although executing the full set of tests in sequence may take up to two hours, running different subsets of the tests simultaneously in parallel threads may allow the full set of tests to complete in 30 minutes or less. Developers can thus be notified whether their code changes pass the full set of tests more quickly, and allow code changes that have passed the full set of tests to be merged into a main code branch more quickly. In addition to executing a full set of tests more quickly for a single new build of a software application, running tests in parallel threads can also reduce overall usage of server time when multiple new builds of the software application are tested. For instance, if testing each build of a software application takes up to 120 minutes when tests are executed sequentially in a single thread, it can take up to 7200 minutes of server time to test sixty different builds in a day. If running the tests in parallel reduces the testing time for each build down to 30 minutes as discussed above, testing sixty builds in a day may instead take only 1800 minutes of server time. However, although executing tests in parallel can speed up testing of a software application, in some cases the parallelization itself can cause errors and/or failed tests during testing.

For example, as discussed above, tests may be written under the assumption that the tests will build on one another in a sequential order. Code changes may pass such tests if the tests are indeed executed sequentially in the originally-intended order. However, the same code changes may not pass the same tests if the tests are executed out of order, for instance because related or dependent tests are executed out of order in different parallel threads.

As an example, multiple tests may attempt to access the same table of a database. The database may be configured to at least briefly lock the table when the table is accessed by a code element, such that the database table cannot be changed by other code elements while the table is locked. If a set of tests are run sequentially in an intended order, a first test may have finished accessing a database table, and the table can thus be unlocked, by the time a second test later attempts to access the database table. The second test may succeed in this scenario due to the unlocked database table. However, if the tests are instead run in parallel as described above, there is a chance that different tests, executing simultaneously in different parallel threads, may attempt to access the same database table at essentially the same time.

This can cause database conflicts, table locking errors, and/or failure of one or more of the tests. For instance, if a database table is locked due to a first test accessing the database table, the table may still be locked if a second test, executing in parallel with the first test, also attempts to access the database table. The database table locking can thus cause the second test to fail, even though the second test may have succeeded if it had been executed at a different time when the database table was not locked due to another test executing in parallel.

The example systems and methods described herein may be directed toward mitigating or overcoming one or more of the deficiencies described above.

SUMMARY

Described herein are systems and methods for testing a software application using a set of test cases distributed among parallel threads, in association with a record-locking database. To avoid database conflicts that may occur when different test cases in different parallel threads attempt to access the same database simultaneously, testing of the software application can be performed in association with a record-locking database that locks database records individually instead of, for example, locking entire database tables. Locking individual database records, instead of entire database tables or other larger database elements, can reduce and/or eliminate the chances that a test case in one parallel thread will be unable to access a record in the database because another test case in another parallel thread is simultaneously accessing the same database table or larger database element.

According to a first aspect, a computer-implemented method can include instantiating, by one or more processors of a computing device, a record-locking database associated with a software application. The method can also include identifying, by the one or more processors, a plurality of test cases associated with the software application, and distributing, by the one or more processors, individual test cases of the plurality of test cases among a plurality of test sets. The different test sets of the plurality of test sets can be configured to execute simultaneously in different parallel threads on the computing device. The method can further include locking, by the one or more processors, a first record in the record-locking database based on an access attempt by a first test case executing via a first parallel thread. The method can also include granting, by the one or more processors, a second test case access to a second record in the record-locking database while the first record is locked, wherein the second test case executes, via a second parallel thread, substantially simultaneously with the first test case executing via the first parallel thread.

According to a second aspect, a computing device can include one or more processors and memory storing computer-executable instructions that, when executed by the one or more processors, cause the one or more processors to perform operations. The operations can include instantiating a record-locking database associated with a software application, identifying a plurality of test cases associated with the software application, and distributing individual test cases of the plurality of test cases among a plurality of test sets. The plurality of test sets can correspond to a plurality of parallel threads. The operations can further include simultaneously executing the plurality of test sets via the plurality of parallel threads. The record-locking database can permit different test cases of the plurality of test cases, executing via different parallel threads of plurality of parallel threads, to simultaneously access different records in the record-locking database.

According to a third aspect, one or more non-transitory computer-readable media can store computer-executable instructions that, when executed by one or more processors, cause the one or more processors to perform operations. The operations can include instantiating a record-locking database associated with a software application, identifying a plurality of test cases associated with the software application, and distributing individual test cases of the plurality of test cases among a plurality of test sets. Different test sets of the plurality of test sets can be configured to execute simultaneously in different parallel threads. The operations can further include locking a first record in the record-locking database based on an access attempt by a first test case executing via a first parallel thread. The operations can also include granting a second test case access to a second record in the record-locking database while the first record is locked, wherein the second test case executes, via a second parallel thread, substantially simultaneously with the first test case executing via the first parallel thread.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
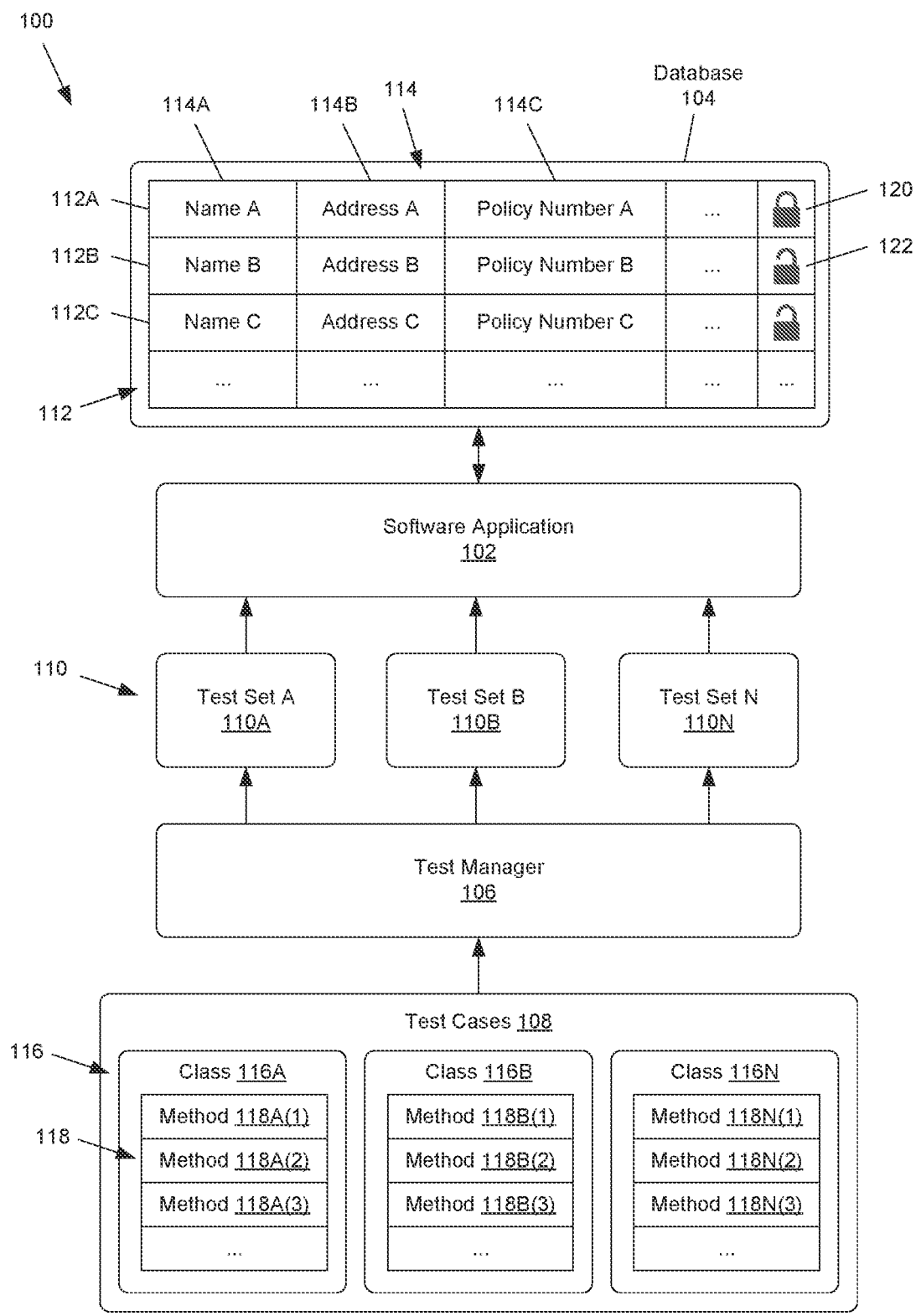
FIG. 1 shows an example of a system for testing a software application that operates in association with a database.

FIG. 1 shows an example of a system 100 for testing a software application 102 that operates in association with a database 104. In particular, the system 100 can include a test manager 106 that distributes code for a set of test cases 108 among different test sets 110 associated with different parallel threads on a computing device. The test manager 106 can cause the test cases 108 in the test sets 110 to execute, substantially simultaneously, in the parallel threads on the computing device in association with one or more instances of the software application 102. Accordingly, executing the test cases 108 in parallel threads can increase the speeds at which the test cases 108 can be executed, relative to executing the test cases 108 in sequence in a single thread.

The software application 102 can be a software program comprising computer-executable instructions associated with one or more functions. As a non-limiting example, the software application 102 can be an insurance policy management system that manages insurance policies by enabling creation, renewal, and/or termination of insurance policies associated with an insurance company, enabling users associated with the insurance company to view and/or edit information about insurance policies, and/or performing other tasks associated with management of insurance policies. In this example, information about insurance policies can be stored in the database 104, such that the software application 102 can access and/or edit information about the insurance policies in the database 104. In other examples, the software application 102 can be a billing and payment system, a customer management system, an order tracking system, an electronic commerce system, a database management system, or any other type of software that operates at least in part based on data stored in the database 104.

The software application 102 can be a compiled and/or executable version of code written in a programming language such as Gosu®, Java®, C++, C#, Python®, or any other programming language. For instance, in examples in which code for the software application 102 is written using Gosu® or Java®, the code can be compiled into an executable and/or deployable file, such as a web application archive (WAR) file or a Java® archive (JAR) file.

Over time, software developers can write new and/or updated code to create new and updated versions of the software application 102. For example, software developers may write new and/or updated code to implement new features of the software application 102, update or enhance existing features of the software application 102, update the software application 102 to communicate with other software applications, or for any other reason. As a non-limiting example, if the software application 102 is the insurance policy management system described above, software developers may write new code to integrate the insurance policy management system with a separate billing system, a separate customer management system, and/or other separate systems or applications.

The database 104 can be a relational database, non-relational database, object-oriented database, network database, hierarchical database, a flat file or other flat structured data storage element, or any other type of database or data storage element that stores records. In some examples, the database 104 may organize data into one or more tables that each have rows and columns. However, in other examples, the database 104 may store data in other formats without the use of tables.

The database 104 can contain any number of records 112A, 112B, 112C, etc. (referred to collectively herein as "records 112") having any number of attributes 114A, 114B, 114C, etc. (referred to collectively herein as "attributes 114"). In some examples, different records 112 can be represented as different rows of a table, while different attributes 114 of the records 112 can be represented as different columns of the table. In other examples, different records 112 can be represented in the database 104 without the use of rows and columns, or tables.

FIG. 1 shows a non-limiting example in which records 112 in the database 104, including a first record 112A, a second record 112B, and a third record 112C, are associated with insurance policies. These example records 112 can each include attributes 114, such a name attribute 114A, an address attribute 114B, a policy number attribute 114C, and/or other types of attributes 114. In other examples, records 112 and their attributes 114 can be associated with any other type of data, such as customer information, order information, billing information, or any other data.

Data in the database 104 can be accessed or changed using a query language, such as the Structured Query Language (SQL), and/or other types of commands or input. For example, the software application 102 may use SQL queries or other commands to add new records 112, edit existing records 112, delete records 112, retrieve one or more attributes 114 of one or more records 112, and/or otherwise interact with the database 104.

In some examples, the software application 102 can be tightly coupled with the database 104. For example, when software application 102 executes, software application 102 can create the database 104 as a tightly coupled database, such that the database 104 can store data used by the software application 102 during execution of the software application 102. In other examples, the software application 102 can be loosely coupled with the database 104. For instance, the database 104 can be initiated and/or maintained separately from the software application 102.

In some examples, the database 104 can be an in-memory database that stores data in random-access memory (RAM) or other volatile memory of a computing device. In other examples, the database 104 can stored in persistent memory such as hard disk drives, solid-state drives, or other non-volatile memory. In some examples, the database 104 can be an "H2mem" database, a "Postgres" database, or any other type of database.

In some examples, the database 104 can be instantiated as an in-memory database when the software application 102 is loaded or instantiated in memory. For example, when the software application 102 is loaded into memory by a computing device for execution, the software application 102 may create a new instance of the database 104 as an in-memory database by defining one or more columns of one of more tables, or by otherwise instantiating the database 104. Thereafter, the software application 102 can add records 112 to the database 104, or otherwise access the database 104, after the in-memory database has been instantiated. For example, records 112 in the database 104 can be accessed based on test cases 108 in one or more test sets 110 that are executed in association with the software application 102 and the database 104, as discussed further below.

Software developers can write code to test the functionality of new or existing versions of the software application 102. For example, one or more software developers can create the set of test cases 108 for unit testing and/or integration testing of the software application 102. The test cases 108 can be designed to verify whether a new or existing version of the software application 102 passes the set of test cases 108 and operates as intended by the software developers. The test cases 108 can test various scenarios regarding how the software application 102 can interact with the database 104. For instance, the test cases 108 may test whether the software application 102 can access the database 104, can access particular tables of the database 104, and/or can access particular records 112 in the database 104.

In some examples, there may be a relatively large number of test cases 108 in part due to regulatory requirements, state laws, business requirements, rules, and/or other factors. For instance, when the software application 102 is a policy management system that manages insurance policies, different states or jurisdictions may have different laws that impact how such insurance policies are to be managed. Accordingly, the set of test cases 108 can include one set of tests that attempt to verify that the software application 102 can successfully manage insurance policies according to the rules of one jurisdiction, as well as another set of tests that attempt to verify that the software application 102 can also successfully manage insurance policies according to the rules of another jurisdiction.

Code for the test cases 108 can be expressed in one or more classes 116A, 116B, . . . 116N, etc. (referred to collectively herein as "classes 116"). Each of the classes 116 can include one or more methods 118. For example, different classes 116 can be associated with different class files, each of which includes code for one or more methods 118. Individual methods 118 can set up data in the database 104 for tests, test functionality associated with the software application 102, output test results, or perform any other operation associated with testing of the software application.

Each method in a class may be a function, such as a function written in Gosu®, Java®, or another programming language. As an example, a file for a class can be a .gs file containing Gosu® code for one or more methods 118. The test cases 108 can include any number of files for classes 116, such as class 116A, class 116B, . . . and class 116N, as shown in FIG. 1. Each class file can include any number of methods 118 as shown in FIG. 1. For example, class 116A can include methods 118A(1), 118A(2), 118A(3), etc. Different class files can include the same or a different amount of methods 118.

As will be discussed further below, some of the classes 116 and/or methods 118 may be related or dependent on one another. For example, a software developer may have written a test case that depends on, or builds on, operations the developer assumed another related test case would already have performed. As another example, a test case may be designed to use or edit data in the database 104 that a software developer assumed another related test case would already have created. As still another example, different test cases may be configured to access the same data in the database 104.

The system 100 for testing the software application 102 can include the test manager 106. The test manager 106 can be an executable software component or script that is configured to manage the execution of the test cases 108, including classes 116 and/or methods 118, with respect to the software application 102. In some examples, the test manager 106 can be associated with a build automation tool, such as Gradle®, that can build new versions of the software application 102, initialize an execution environment for the software application 102, and/or define tasks to be executed with respect to the software application 102. For example, the test manager 106 may create one or more Gradle® executors, or other scripts, code, configurations, or computer-executable instructions that cause one or more instances of the software application 102 to execute test cases 108 of different test sets 110 in association with the database 104, or otherwise cause the different test sets 110 to be executed in association with the database 104.

The test manager 106 can be configured to distribute the test cases 108 among different test sets 110. For example, as shown in FIG. 1, the test manager 106 can distribute the test cases 108 into any number of test sets 110A, 110B, . . . 110N, etc. (referred to collectively herein as "test sets 110"). In some examples, the test manager 106 can obtain a list object, or other data, that identifies individual test cases 108. The test manager 106 can then distribute the individual test cases 108 among the different test sets 110 at a class level and/or a method level, as discussed further below.

In some examples, the test manager 106 can distribute test cases 108 to test sets 110 at a class level. In these examples, the test manager 106 can distribute all of the methods 118 of a particular class to the same test set, and may distribute methods 118 from other classes 116 to the same test set or other test sets 110. As a non-limiting example, the test manager 106 may assign the methods 118A of class 116A to the first test set 110A, and the methods 118B of class 116B to the second test set 110B. As another non-limiting example, the test manager 106 may assign the methods 118A of class 116A, and the methods 118B of class 116B, to the first test set 110A, and assign methods of other classes 116 to other test sets 110.

In some examples, the test manager 106 can also, or alternately, distribute test cases 108 to test sets 110 at a method level. In these examples, the test manager 106 can distribute subsets of the methods 118 of the same class among different test sets 110. As a non-limiting example, the test manager 106 may assign methods 118A(1) and 118A(2) of class 116A to the first test set 110A, but assign method 118A(3) of class 116A to the second test set 110B. In some examples, the test manager 106 may also allocate subsets of methods 118 from different classes 116 to the same test set when distributing test cases at a method level. As a non-limiting example, the test manager 106 may assign method 118A(3) of class 116A to the second test set 110B, and also assign method 118B(3) to the second test set 110B.

In some cases, the test manager 106 may dynamically distribute an equal number of test cases 108 to different test sets 110. In other cases, the test manager 106 may dynamically distribute an unequal number of test cases 108 to different test sets 110, for instance based on predicted execution times or other factors.

As a first non-limiting example of distributing an unequal number of tests cases 108 to different test sets 110, the test manager 106 may determine that a set of five hundred methods from a first class is expected to take approximately five minutes to execute. However, the test manager 106 may determine that a second class and a third class each have only two hundred methods, and that together the four hundred methods of the second class and the third class may also take approximately five minutes to execute. Accordingly, the test manager 106 may assign the five hundred methods from a first class to a first test set, and assign the four hundred methods from the second class and the third class to a second test set. This may eliminate or reduce idle processor cycles or server time, relative to assigning each of the three classes to different test sets and waiting for the four hundred methods of the first class to complete after the two hundred methods of the second class and the third class have each completed separately in other parallel threads.

As a second non-limiting example of distributing an unequal number of tests cases 108 to different test sets 110, the test manager 106 may determine that a first subset of three hundred test cases 108 is expected to take approximately five minutes to execute, and may determine that a second subset of one thousand other test cases 108 is also expected to take approximately five minutes to execute. Accordingly, the test manager 106 may assign the first subset of the three hundred test cases 108 to a first test set, and assign the second subset of one thousand test cases 108 to a second test set, such that both test sets are expected to take approximately the same amount of time to execute despite differing numbers of test cases in the two test sets.

The test manager 106 can also be configured to cause different test sets 110 to execute simultaneously, in parallel, in association with the software application 102 and the database 104. For example, a computing device can initiate a first instance of the software application 102 in a first parallel thread, and also initiate a second instance of the software application 102 in a second parallel thread. The computing device can accordingly execute a first set of methods 118 assigned to the first test set 110A in the first parallel thread in association with the database 104, and simultaneously execute a second set of methods 118 assigned to the second test set 110B in the second parallel thread in association with the database 104. Methods 118 assigned to a test set may execute in sequence with respect to other methods 118 within the same test set, however the computing device can execute different methods 118 associated with different test sets 110 in different parallel threads at substantially the same time. The test manager 106 may also collect test results associated with the methods and/or classes of different test sets 110 that execute in different parallel threads, and combine the test results into an aggregated test result report, for example as discussed below with respect to FIG. 2.

The computing device can use virtual machines, hyper-threading, parallel threads, and/or any other type of parallelization to execute test cases 108 of different test sets 110 in parallel at substantially the same time. The computing device can set up and use any number of parallel threads, depending on the memory, processing power, and/or other computing resources available to the computing device. For example, the computing device can be a server that has 128 GB of memory and 16 CPUs. In this example, if different instances of the software application 102 each use approximately 15 GB of memory when executed via virtual machines, the computing device may initialize eight parallel threads that are each allocated 16 GB of memory. The test manager 106 can accordingly distribute the test cases 108 among eight test sets 110 that correspond to the eight parallel threads.

In some examples, the test manager 106 can use a Java® concurrent "ExecutorService," or other system, to initialize a fixed number of parallel threads in a thread pool, distribute the methods 118 of the test cases 108 among different test sets 110 associated with different initialized parallel threads, and use one or more callable objects to execute the methods 118 of the different test sets 110 in association with the parallel threads. In some examples, the test manager 106 can use tasks or scripts associated with a build automation tool, such as Gradle®, to distribute the methods among test sets 110 and to cause execution of the test sets 110 in parallel. For example, the test manager 106 can use Gradle® tasks or other scripts to dynamically set up different executors associated with the software application 102 in different parallel threads, distribute methods 118 of the test cases 108 among different test sets 110 associated with the parallel threads at a class level and/or a method level, cause the different executors to execute the methods 118 of the test sets 110 in parallel, and/or to combine corresponding sets of test results into an aggregated test result report.

As a non-limiting example, if the test cases 108 contain seven thousand classes 116, the test manager 106 may divide the seven thousand classes 116, at a class level, into seven different test sets 110 that each contain methods 118 aggregated from a different set of approximately one thousand classes 116. Each of these seven test sets 110 can be associated with a different thread of a pool of seven parallel threads. The test manager 106 can cause the seven test sets 110 to be executed in parallel, substantially simultaneously, via the seven different parallel threads. Accordingly, the full set of seven thousand classes 116 may execute in parallel more quickly than the seven thousand classes 116 could execute in sequence in a single thread. Executing the classes 116 in parallel can also reduce server time or usages of other computing resources, relative to executing the classes 116 in a single thread.

As another non-limiting example, if a particular class includes a set of one hundred methods 118, the test manager 106 may divide those one hundred methods 118, at a method level, into multiple test sets 110 that can be executed simultaneously in parallel threads. Accordingly, the full set of one hundred methods 118 can execute in parallel more quickly than executing the full set of one hundred methods 118 in sequence in a single thread. Executing the methods 118 in parallel can also reduce server time or usages of other computing resources, relative to executing the methods 118 in a single thread.

Although the test manager 106 may distribute classes 116 and/or methods 118 of the test cases 108 among multiple test sets 110, and cause the test sets 110 to execute in parallel, the test cases 108 may not have been written by software developers with parallelization in mind. For example, the test cases 108 may have been written by software developers under the assumption that the classes 116 and/or methods 118, including related or dependent classes 116 and/or methods 118, would be executed sequentially in a particular intended order in a single thread. Accordingly, executing the test cases 108 in parallel as part of different test sets 110 may cause classes 116 and/or methods 118 to execute in a different order than the developer's intended order.

As an example, different methods 118 in a single class, and/or in different classes 116, may attempt to access the same table in the database 104. For instance, a first method may access the first record 112A in the table shown in FIG. 1 to edit an address attribute 114B, while a second method may access the second record 112B in the same table to edit a name attribute 114A. These two methods may have been written under an assumption that the two methods would execute at different times. For instance, the two methods may be functions within the same class file, and a developer may assume from the structure of the class file that the first method will execute prior to the second method. As another example, the first method may be within the first class 116A, the second method may be within the second class 116B, and a developer may assume that the methods of the first class 116A will execute before methods of the second class 116B.

However, because the test manager 106 may distribute methods into different test sets 110 that execute in parallel, there is a chance that the developers' assumptions about the execution order of the first method and the second method may be incorrect. For instance, the first method and the second method may execute at substantially the same time in different parallel threads as part of different test sets 110, such that the first method and the second method attempt to access the same table in the database 104 simultaneously.

Accordingly, at least during testing of the software application 102 in association with parallel threads as described herein, the database 104 can be instantiated as a record-locking database so that different methods 118 of different test sets 110 executing in different parallel threads can access different records 112 in the database 104 simultaneously. A record-locking database can lock individual records 112 in the database 104 when such records 112 are accessed. The record-locking database may accordingly be different from a table-locking database that locks an entire table when any record of the table is accessed. The record-locking database may also be different from other types of databases that lock an entire database, or other data structure larger than an individual record, when any individual record is accessed. As a non-limiting example, the database 104 can be an "H2mem" in-memory database that uses Multi-Version Concurrency Control (MVCC) to set database locks at a record level, rather than an "H2mem" in-memory database with a default "MVStore" engine that is configured to at least briefly lock an entire database table when the table is accessed.

A record-locking database may at least briefly lock individual records 112 when software elements access such individual records 112, for instance to delete, insert, and/or update individual records 112. A software element connected to the record-locking database may have access to committed data within the record-locking database, as well as to changes made by the software element that have not yet been committed to the database. For example, if a first software element updates a row of a table but has not yet committed the change, a second software element may not have access to the updated data in that row until the updated data is committed to the database. In some examples, the record-locking database may use an exclusive lock on a table when adding or removing columns of a table, or when dropping the table.

As an example, if the software application 102 accesses record 112A, the record-locking database can respond by locking record 112A while record 112A is being accessed. In the example shown in FIG. 1, a lock icon 120 indicates that record 112A is locked. However, even though record 112A is locked in the table, record 112B may simultaneously be unlocked in the same table. In the example shown in FIG. 1, an unlock icon 122 indicates that record 112B is unlocked. Accordingly, because record 112B is unlocked, the software application 102 can access record 112B at the same time that record 112A is locked.

In contrast to table-locking databases that may lock an entire table as changes are processed and committed, here the record-locking database may instead at least briefly lock individual records 112 of a table when the software application 102 accesses such individual records 112. Accordingly, even if one or more individual records 112 of a table are locked in the record-locking database at a particular moment in time, other records 112 of the same table can remain accessible during that particular moment in time. As such, due to the database 104 being instantiated as a record-locking database during testing, one or more instances of the software application 102 may simultaneously access more than one record in a particular table in the database 104 during testing.

Similarly, in contrast to other types of databases that may lock the entire database, or lock data structures larger than individual records when the database is accessed, the record-locking database can be configured to lock individual records when the individual records are accessed. Accordingly, even if one or more individual records 112 in the record-locking database are locked at a particular moment in time, other records 112 in the same record-locking database can remain accessible during that particular moment in time. As such, due to the database 104 being instantiated as a record-locking database during testing, one or more instances of the software application 102 may simultaneously access more than one record in the database 104 during testing. Accordingly, different test cases 108 in different test sets 110 that execute concurrently may be able to access different records 112 in the same database 104 during testing.

As a non-limiting example, a first method in test set 110A may execute in a first parallel thread a millisecond before a second method in test set 110B executes in a second parallel thread. The first method may access the first record 112A shown in FIG. 1, and thereby cause the record-locking database to lock record 112A as shown in FIG. 1. However, if the second method attempts to access the second record 112B a millisecond later, the second record 112B can be unlocked as shown in FIG. 1, even if record 112A is still locked and is still being accessed by the first method. Accordingly, the second method can succeed in accessing the second record 112B in the record-locking database, despite the first method simultaneously accessing the first record 112A.

It may be relatively common for methods 118 of different test sets 110 to attempt to access the same table in the database 104, or to attempt to access the same database 104 overall, at substantially the same time when the test sets 110 are executed in parallel. However, it may be much less likely that methods 118 of different test sets 110 executing in parallel will simultaneously attempt to access the exact same record of the same database. Accordingly, testing the software application 102 by executing different test sets 110 in parallel in association with a record-locking database that permits different records 112 of the same table, and/or of the entire database 104, to be accessed simultaneously can reduce the number of test failures and/or database conflict errors that might otherwise occur if the database 104 was a table-locking database or another type of database configured to lock data structures larger than individual records 112. Reducing the number of such test failures and/or database conflict errors by using a record-locking database can decrease the chances that testing of the software application 102 will fail, thereby reducing the chances that software developers will need to recheck code and/or re-run the testing. In turn, reducing the number of test failures and/or database conflict errors by using a record-locking database can also reduce the overall usage of server time or other computing resources associated with testing the software application 102.

In some examples, if a particular method of a test set does attempt to access a record that is locked in the record-locking database, for instance because the record is currently being accessed by another method executing simultaneously as part of another test set, the test manager 106 can cause execution of the particular method to be retried at a later point in time. As a non-limiting example, if a first method accesses record 112A and thereby causes record 112A to be locked in the database 104 for three milliseconds, a second method in another test set may attempt to also access record 112A during the three-millisecond lock period. Although record 112A being locked might otherwise cause the second method to fail, and in turn lead to a failed test of the software application 102, the test manager 106 may detect a record locking error reported by the database 104 when the second method attempts to access record 112A. In response to the record locking error, the test manager 106 can cause execution of the second method to be retried after the three-millisecond lock period, or after the test manager 106 determines that record 112A has been unlocked. Accordingly, the second method can be retried after record 112A is unlocked again, such that the second method can succeed and test failures due to record-locking in the database 104 can be avoided.

In some examples, the test manager 106 can maintain one or more test failure logs that track errors or other test failures that occur with respect to one or more test sets 110. For example, the test manager 106 can maintain a first test failure log associated with test set 110A, a second test failure log associated with the test set 110B, and other test failure logs associated with other groups of test cases 108 assigned to other test sets 110. Accordingly, the test manager 106 can maintain different individual test failure logs associated with test sets 110 corresponding to different parallel threads. In other examples, the test manager 106 may maintain a single test failure log associated with all of the test sets 110 and parallel threads. For example, the single test failure log may identify failed test cases of test set 110A, failed test cases of test set 110B, and/or failed test cases of other test sets. Each of the test failure logs may identify specific test cases 108, such as specific classes 116 and/or methods 118, that failed during an initial execution attempt in a parallel thread.

In some examples, a test failure log may also indicate a failure code for each failed test case that indicates a reason why the test case failed. Failure codes may be alphanumeric characters, integers, text values, or any other type of code or data that indicates a reason why a corresponding test case failed. For instance, a test failure log may indicate that a particular test case failed due to a record-locking error. Accordingly, the test manager 106 can determine from a test failure log that the test case failed due to a record-locking error, and cause that test case to be re-executed at a later point in time at which the record-locking error may be less likely to re-occur.

Overall, in a testing environment in which different test sets 110 are executed in parallel against the same database 104, the use of a record-locking database can reduce the risk of test cases 108 failing because multiple test cases 108 attempt to access the same database or same table in the database simultaneously. Additionally, if multiple test cases 108 do attempt to simultaneously access the same record in the database 104, the test manager 106 can cause any of those test cases 108 that fail to be re-executed at a later time when it may be less likely that multiple test cases 108 are attempting to access the same record simultaneously. Accordingly, testing of the software application 102 may be more likely to complete successfully, without errors or test failures that may be caused by parallelization of the testing process and not by bugs or other errors in the code of the software application 102.

Figure 2:
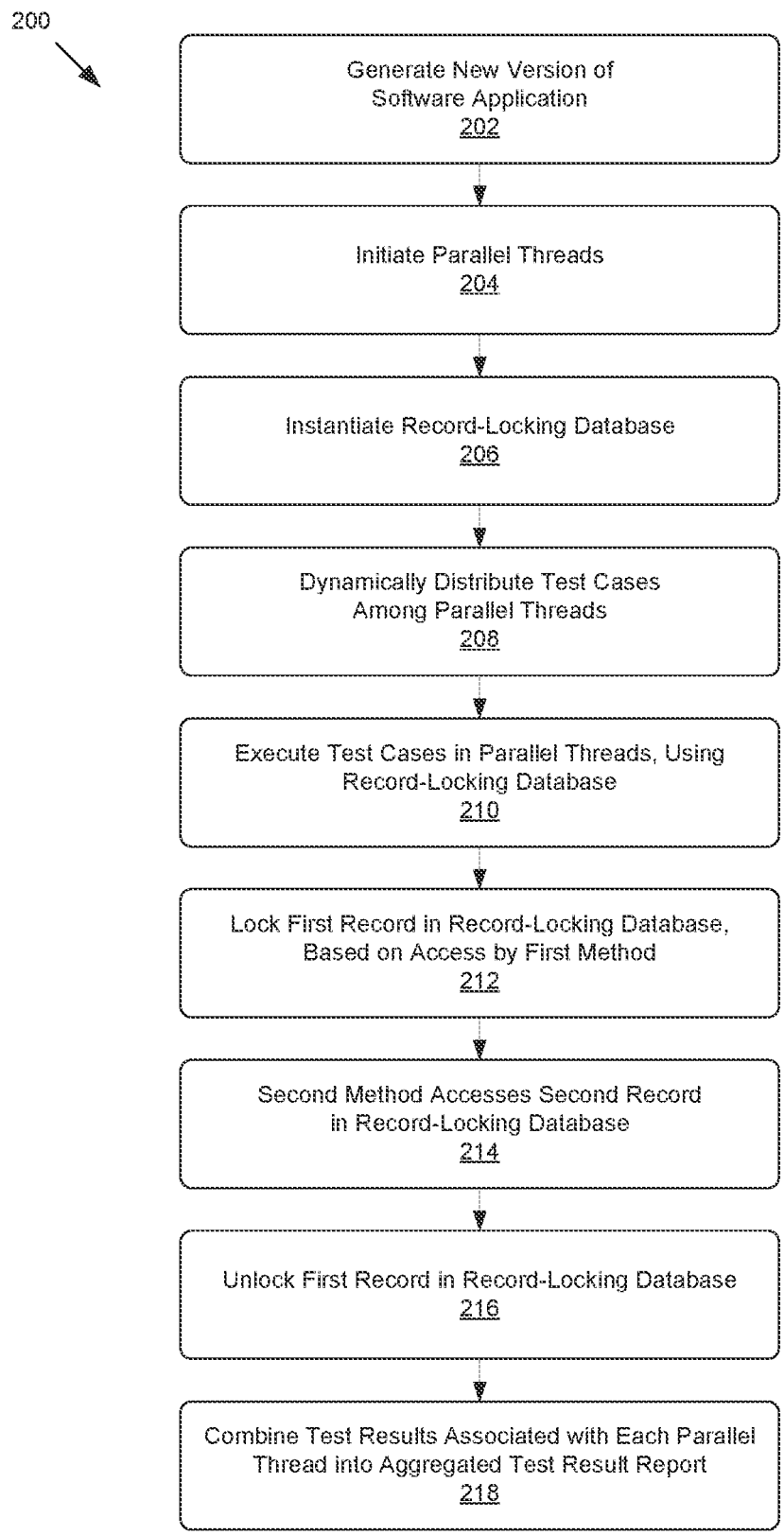
FIG. 2 shows a flowchart of a first example process for generating and testing the software application using parallel threads and the record-locking database.

FIG. 2 shows a flowchart of a first example process 200 for generating and testing the software application 102 using parallel threads and the record-locking database. At block 202, a computing system can generate a new version of the software application 102. For example, a developer may have written new code, and/or changed existing code, associated with the software application 102 and/or the test cases 108. The developer can submit the new code to a compiler or code management system, and request that the new and/or changed code be compiled, along with unchanged code, into a new executable version of the software application 102. For example, the computing system can generate a new version of the software application 102 as a new executable and/or deployable WAR file or JAR file. In some examples, the computing system can use tasks of a build automation tool, such as Gradle®, to build the new version of the software application 102.

At block 204, the computing system can initiate a set of parallel threads. For example, the test manager 106 can use Gradle® tasks, or tasks of another build automation tool, to dynamically set up an execution environment that includes a set of parallel threads, and different executors associated with the software application 102 in different parallel threads. In some examples, the test manager 106 can use a Java® concurrent "ExecutorService" to initialize a fixed number of parallel threads in a thread pool.

At block 206, the computing system can instantiate the database 104 as a record-locking database. For example, the test manager 106 can use Gradle® tasks, or tasks of another build automation tool, to instantiate the database 104 in memory as a record-locking database. As another example, the software application 102 can create the database 104 when the software application 102 is loaded or executed. For instance, the software application 102 can be tightly coupled to the database 104, such that the software application 102 creates the database 104 when the software application 102 executes. In some examples, the database 104 can be instantiated as an "H2mem" in-memory database that uses MVCC to set database locks at a record level.

At block 208, the computing system can dynamically distribute test cases 108 among different test sets 110. For example, the test manager 106 can identify classes 116 in the test cases 108, and can distribute the test cases 108 among the test sets 110 at a class level and/or at a method level. Each test set can be associated with a different parallel thread of the parallel threads initiated at block 204.

At block 210, the computing system can cause the test sets 110 to execute, in the parallel threads, in association with the record-locking database. For example, the test manager 106 can use one or more callable objects to execute the methods 118 of the different test sets 110 in association with the parallel threads and the database 104. Individual test cases 108 in the test sets 110 may succeed or fail when executed.

At block 212, the computing system may lock a first record in the database 104. For example, a first method, executing in a first parallel thread in association with a first test set, may attempt to edit the first record in the database 104. As the first method is updating data for the first record, the database 104 can lock the first record in the database 104.

At block 214, a second method may access a second record in the database 104. In some examples, the second record may be in the same table of the database 104 as the first record. However, although the computing system may have locked the first record in the table during access of the first record by the first method at block 212, other records of the table may remain unlocked because the database 104 is a record-locking database. Accordingly, the second record can be unlocked and accessible to the second method at block 214. The second method can thus successfully access the second record as part of a test case, which may lead a successful test of the software application 102 associated with the second method.

At block 216, the computing system can unlock the first record in the database 104. As discussed above, the first record may have been locked at block 214 due to the first method accessing the first record. However, at block 216, the first method can have finished accessing the first record, and the first record can accordingly be unlocked in the database 104. The first method can have successfully accessed the first record as part of a test case, which may lead a successful test of the software application 102 associated with the first method.

In some examples, if the second method had, at block 214, instead attempted to access the first record while the first record was locked, the test manager 106 may delay or retry execution of the second method. In these examples, the test manager 106 may cause the second method to be re-executed after a predetermined period of time, or after an indication that the first record has become unlocked. Accordingly, when two methods attempt to access the same record substantially simultaneously in the record-locking database, retrying the second method after that record becomes unlocked can avoid a test failure that would have been based solely on the second method being unable to access the first record while it was locked in the database 104.

At block 218, the computing system can aggregate results of the tests associated with the test cases 108. In some examples, the test manager 106 can receive different sets of test results associated with different test sets 110 that execute in different parallel threads. The test manager 106 can combine the different sets of test results into a single aggregated test result report, or otherwise aggregate the test results. The test manager 106 may output the single aggregated test result report, for instance in a format that is visible and/or usable by a user. In other examples, the test manager 106 may aggregate test results into any other format. The aggregated test results may indicate whether the new version of the software application 102 passed all of the test cases 108. In some examples, if the new version of the software application 102 did not pass all of the test cases 108, the aggregated test results may identify which test cases 108 did not pass, and/or provide corresponding diagnostic details about test failures and/or errors. In some examples, after generating and/or outputting the aggregated test results, the test manager 106 may discard the different individual sets of test results that were generated in association with different parallel threads.

In some examples, at the conclusion of testing, the computing system can also de-allocate memory or other computing resources associated with the software application 102 and the database 104. For example, if server memory had been allocated to execute eight test sets 110 in association with the database 104, the allocated memory can be deallocated and/or cleaned up to prepare the server for a subsequent round of testing.

Process 200 can be used to determine whether a version of the software application 102 passes all of the test cases 108. If the version of the software application 102 does not pass all the test cases 108, the version of the software application 102 can be re-coded or otherwise changed until it does pass all of the test cases 108. However, if the version of the software application 102 does pass all the test cases 108, passing all the test cases 108 may indicate that the version of the software application 102 is suitable to deploy in other environments, such as other testing environments, in other development environments, and/or in production environments.

In some examples, process 200 can be used for local testing of the software application 102 based on changes made by a single developer, and/or for global testing of the software application based on changes made by multiple developers, as discussed further below with respect to FIG. 3. In both situations, by distributing test cases 108 among different test sets 110 and executing the test sets 110 in parallel, overall testing times can be reduced relative to executing the test cases 108 in sequence. Additionally, by executing different test sets 110 in parallel against a record-locking database, occurrences of database errors that might occur if different test cases 108 execute in parallel in association with a different type of database can be reduced and/or eliminated.

Figure 3:
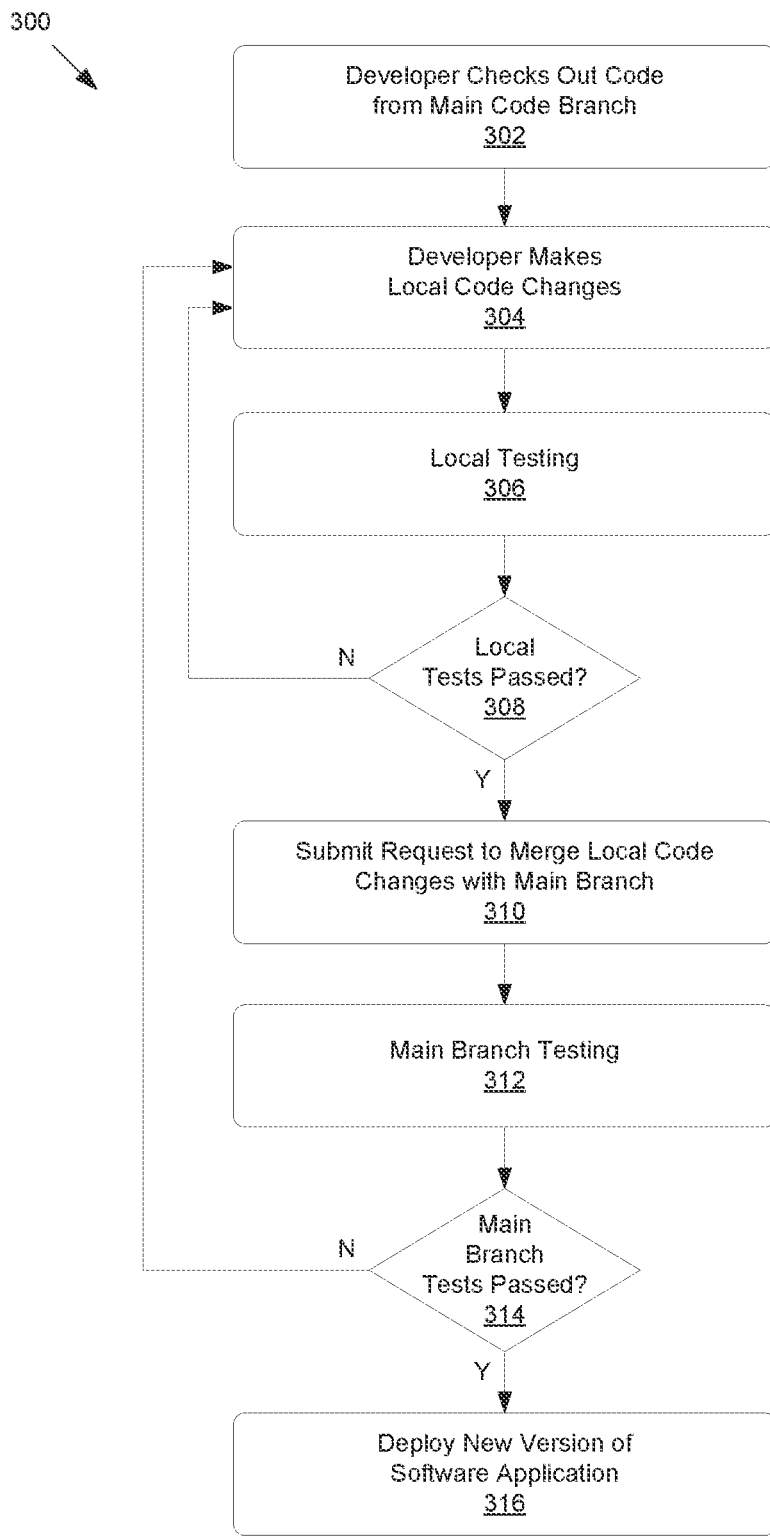
FIG. 3 shows a flowchart of a second example process for generating and testing the software application using parallel threads and the record-locking database.

FIG. 3 shows a flowchart of a second example process 300 for generating and testing the software application 102 using parallel threads and the record-locking database. At block 302, a computing device associated with a software developer can check out source code associated with the software application 102 and/or the test cases 108 from a main code branch. For example, the source code can be stored in a main code branch at a central repository available to a team of software developers. The computing device may receive a "check out" command from the software developer. Such a "check out" command, or other command, can cause the computing device to retrieve a copy of the source code from the central repository, and thereby check out the source code from the main code branch. Accordingly, at block 302, a computing device associated with a particular software developer can transfer a copy of the source code from the central repository and thus check out a copy of the source code from the main code branch.

At block 304, the computing device can make changes to the source code associated with the software application 102 and/or the test cases 108 locally. The computing device can display the source code within a text editor, an integrated development environment (IDE), or other programming environment. The software developer can type new code and/or input other commands via the text editor, IDE, or other programming environment, which can cause the computing device to edit the source code checked out at block 302.

As an example, input provided by the software developer can cause the computing device to add new code or change existing code associated with the software application 102. As another example, input provided by the software developer can cause the computing device to add or change configuration files or other settings associated with the software application 102. As yet another example, input provided by the software developer can cause the computing device to add edit code for test cases 108, including adding one or more new test cases 108, removing one or more test cases 108, and/or changing source code for one or more test cases 108.

At block 306, the computing device can initiate local testing of the software application 102 based on the local changes to the source code associated with the software application 102 and/or the test cases 108. The local testing can include the operations of example process 200 shown and described with respect to FIG. 2. For instance, the computing device, or a separate centralized computing device, can build a new version of the software application based on the local code changes associated with the software application 102 and/or the test cases 108 made at block 304, initiate parallel threads, instantiate a record-locking database, distribute test cases 108 among different test sets 110 corresponding to different parallel threads, execute the test sets 110 in the parallel threads in association with the new version of the software application 102, and output an aggregated test result report based on test results corresponding to the different test sets 110.

At block 308, the system can determine whether the new version of the software application 102, built and tested based on local changes to the source code, passed all of the test cases 108. If the aggregated test result report indicates that the new version of the software application 102 did not pass all of the test cases 108 executed locally at block 306 (Block 308—No), the software developer can provide input that causes the computing device to make further changes to the source code locally at block 304, and the computing device can retry local testing at block 306. However, if the aggregated test result report indicates that the new version of the software application 102 did pass all of the test cases 108 executed locally (Block 308—Yes), the computing device can submit a merge request at block 310. For example, based on the test result report indicating that local testing has succeeded, the software developer can input a command that causes the computing device to submit a merge request.

The merge request submitted at block 310 can be a request to combine the local code changes associated with the software application 102 and/or the test cases 108, made at block 304, with the main code branch, such that the code changes become part of the main code branch, override previously existing code in the main code branch, and can be checked out from the main code branch by computing devices associated with other software developers. Although the local code changes may have passed local testing, the main code branch may have changed between blocks 302 and 310, for instance if other code changes made by other software developers have been merged into the main branch such that the local changes made at block 304 to code checked out from the main code branch at block 302 would conflict with more recent changes to the main code branch. To determine if the local code changes would conflict with any other changes made to the main code branch, main branch testing can be performed at block 312.

In some examples, the merge request submitted at block 310 may initiate a code review process by which one or more other software developers review the local code changes associated with the software application 102 and/or the test cases 108 made at block 304. In these examples, if the other software developers do not approve local code changes made by a software developer as part of the code review process, the software developer can return to make further changes to the source code locally via the computing device at block 304. However, if the other software developers do approve the local code changes as part of the code review process, the main branch testing can be performed at block 312.

The main branch testing performed at block 312 can include the operations of example process 200 shown and described with respect to FIG. 2. For instance, a centralized computing device can build a new version of the software application based on the local code changes associated with the software application 102 and/or the test cases 108 made at block 304 as well as the most recent version of the main code branch. The centralized computing device can also initiate parallel threads, instantiate a record-locking database, distribute test cases 108 among different test sets 110 corresponding to different parallel threads, execute the test sets 110 in the parallel threads in association with the new version of the software application 102, and output an aggregated test result report based on test results corresponding to the different test sets 110.

At block 314, the system can determine whether the new version of the software application 102, built based on a combination of the local changes to the source code associated with the software application 102 and/or the test cases 108 and the most recent version of the source code in the main branch, passed all of the test cases 108. If the aggregated test result report indicates that the new version of the software application 102 did not pass all of the test cases 108 executed at block 312 (Block 314—No), the software developer can provide input that causes the computing device to make further local changes to the source code at block 304. The computing device can then cause local testing to be retried at block 306 and/or main branch testing to be retried at block 312. However, if the aggregated test result report indicates that the new version of the software application 102 built during main branch testing at block 312 did pass all of the test cases 108 executed at block 312 (Block 314—Yes), the new version of the software application 102 built during block 312 can be deployed in other environments at block 316. For example, at block 316, the new version of the software application 102 can be deployed in other testing environments, in other development environments, and/or in production environments.

Process 300 can be used to determine whether a version of software application passes all of the test cases 108 at a local level and/or when merged into a main code branch. In both situations, by distributing test cases 108 among different test sets 110 and executing the test sets 110 in parallel, overall testing times can be reduced relative to executing the test cases 108 in sequence. Additionally, by executing different test sets 110 in parallel against a record-locking database, occurrences of database errors that might occur if different test cases 108 execute in parallel in association with a different type of database can be reduced and/or eliminated. Process 300 can be performed by a computing device associated with a single developer and/or by a central server or other computing device associated with multiple developers, an example of which is shown and described below with respect to FIG. 4.

Figure 4:
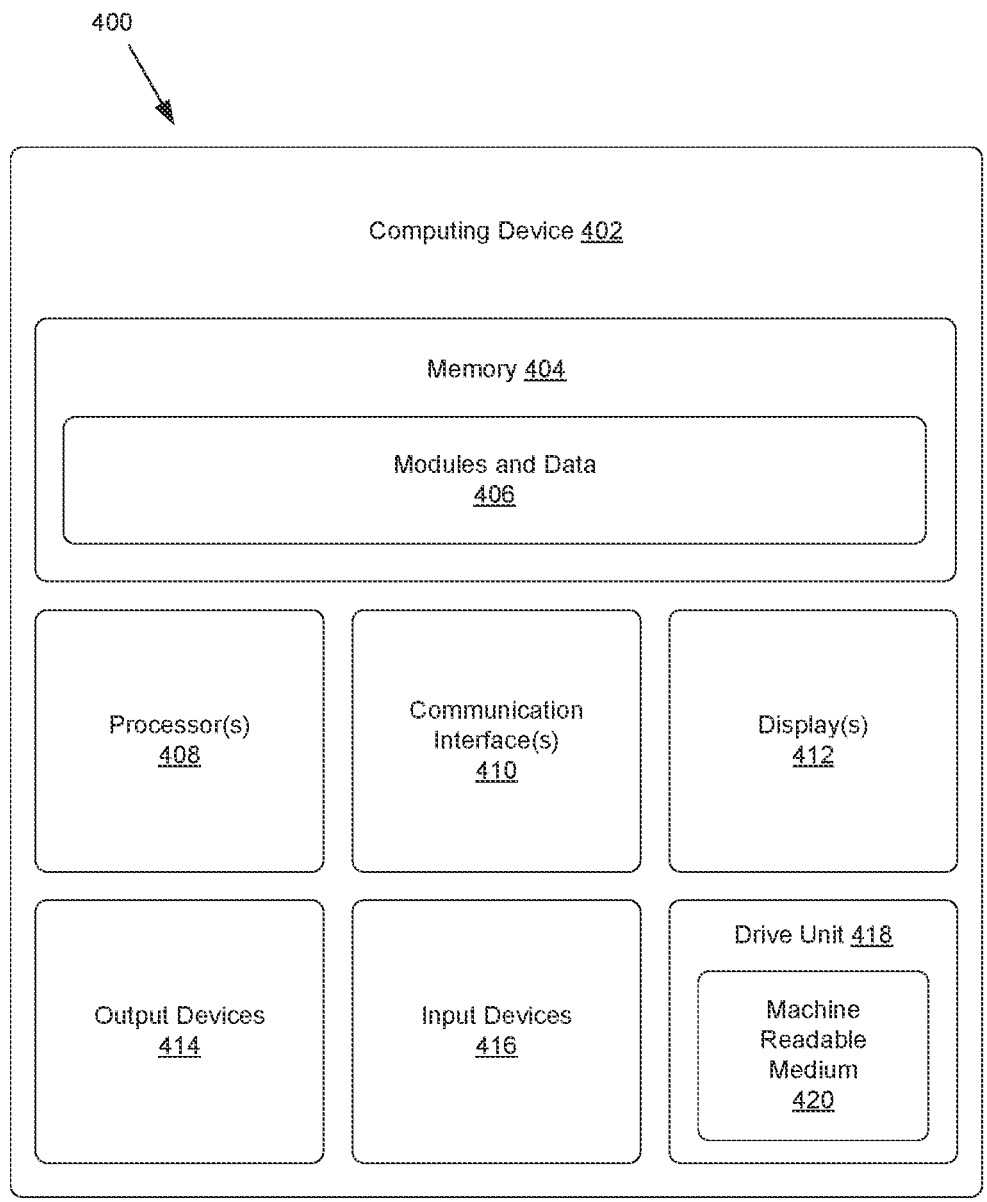
FIG. 4 shows an example system architecture for a computing device.

FIG. 4 shows an example system architecture 400 for a computing device 402 associated with the test manager 106 and/or software application 102 described herein. The computing device 402 can be a server, computer, or other type of computing device that executes the test manager 106, and/or executes instances of the software application 102 and/or test sets 110 in parallel in association with the same database 104.

The computing device 402 can include memory 404. In various examples, the memory 404 can include system memory, which may be volatile (such as RAM), non-volatile (such as ROM, flash memory, etc.) or some combination of the two. The memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 402. Any such non-transitory computer-readable media may be part of the computing device 402.

The memory 404 can store modules and data 406. The modules and data 406 can include data associated with the test manager 106, the software application 102, the test cases 108, the test sets 110, the database 104, and/or other data. The modules and data 406 can also include any other modules and/or data that can be utilized by the computing device 402 to perform or enable performing any other actions. Such other modules and data can include a platform, operating system, and applications, and data utilized by the platform, operating system, and applications.

As discussed above, the test manager 106 may cause portions of the memory 404 to be allocated to different parallel threads. For instance, the test manager 106 may allocate portions of an overall amount of the memory 404 to different parallel threads, and cause different instances of the software application 102 to execute in the different parallel threads.

The computing device 402 can also have processor(s) 408, communication interfaces 410, displays 412, output devices 414, input devices 416, and/or a drive unit 418 including a machine readable medium 420.

In various examples, the processor(s) 408 can be a central processing unit (CPU), a graphics processing unit (GPU), both a CPU and a GPU, or any other type of processing unit. Each of the one or more processor(s) 408 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 408 may also be responsible for executing computer applications stored in the memory 404, which can be associated with common types of volatile (RAM) and/or nonvolatile (ROM) memory.

The communication interfaces 410 can include transceivers, modems, interfaces, antennas, telephone connections, and/or other components that can transmit and/or receive data over networks, telephone lines, or other connections.

The display 412 can be a liquid crystal display or any other type of display commonly used in computing devices. For example, a display 412 may be a touch-sensitive display screen, and can then also act as an input device or keypad, such as for providing a soft-key keyboard, navigation buttons, or any other type of input.

The output devices 414 can include any sort of output devices known in the art, such as a display 412, speakers, a vibrating mechanism, and/or a tactile feedback mechanism. Output devices 414 can also include ports for one or more peripheral devices, such as headphones, peripheral speakers, and/or a peripheral display.

The input devices 416 can include any sort of input devices known in the art. For example, input devices 416 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 420 can store one or more sets of instructions, such as software or firmware, that embodies any one or more of the methodologies or functions described herein. The instructions can also reside, completely or at least partially, within the memory 404, processor(s) 408, and/or communication interface(s) 410 during execution thereof by the computing device 402. The memory 404 and the processor(s) 408 also can constitute machine readable media 420.

The computing device 402 can execute testing of a software application more quickly and/or with fewer computing resources than other systems. For example, by executing the test manager 106 to distribute test cases 108 among different test sets 110 that can be executed in parallel, the test cases 108 can be executed more quickly than the test cases 108 could be executed in sequence. As a non-limiting example, although the computing device 402 might take up to two hours to execute a full set of test cases in sequence, executing different test sets 110 simultaneously in parallel on the computing device 402 may allow the full set of test cases 108 to complete in 30 minutes or less. Developers can thus be notified whether their code changes pass the full set of test cases 108 more quickly, and allow code changes that have passed the full set of test case 108 to be merged into a main code branch more quickly.

Similarly, executing test cases 108 in parallel can also reduce overall usage of computing resources on the computing device 402 when multiple new builds of a software application are tested. As a non-limiting example, although the computing device 402 might take up to two hours to execute a full set of test cases in sequence, and thus take up to 7200 minutes to test sixty different builds in a day, reducing the testing for each build down to 30 minutes or less by executing different test sets 110 simultaneously in parallel may allow the computing device 402 to execute the full set of test cases 108 for all sixty builds in only 1800 minutes.

Moreover, because the database 104 is a record-locking database that allows different records 112 to be accessed simultaneously by different test cases 108 that are executing in parallel, database errors that could prolong testing that may otherwise occur when executing test cases 108 in parallel against other types of databases can be reduced and/or eliminated.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
    instantiating, by one or more processors of a computing device, a record-locking database associated with a software application;
    identifying, by the one or more processors, a plurality of test cases associated with the software application;
    distributing, by the one or more processors, individual test cases of the plurality of test cases among a plurality of test sets,
        wherein different test sets of the plurality of test sets are configured to execute simultaneously in different parallel threads on the computing device;
    locking, by the one or more processors, a first record in the record-locking database based on an access attempt by a first test case executing via a first parallel thread; and
    granting, by the one or more processors, a second test case access to a second record in the record-locking database while the first record is locked,
        wherein the second test case executes, via a second parallel thread, substantially simultaneously with the first test case executing via the first parallel thread.

2. The computer-implemented method of claim 1, wherein:
    the plurality of test cases comprises a set of classes,
    individual classes, of the set of classes, comprise one or more methods, and
    the one or more methods are functions written in a programming language.

3. The computer-implemented method of claim 2, wherein the distributing is performed at a class level.

4. The computer-implemented method of claim 2, wherein the distributing is performed at a method level.

5. The computer-implemented method of claim 1, further comprising:
    detecting, by the one or more processors, an attempt by a third test case to access the first record while the first record is locked,
        wherein the third test case executes, via a third parallel thread, substantially simultaneously with the first test case executing via the first parallel thread;
    determining, by the one or more processors, that the first record is unlocked following the access attempt by the first test case; and
    retrying, by the one or more processors, execution of the third test case based on determining that the first record is unlocked.

6. The computer-implemented method of claim 1, wherein the record-locking database is an in-memory database.

7. The computer-implemented method of claim 1, further comprising:

generating, by the one or more processors, a local build of the software application based on code changes submitted locally,
wherein the instantiating, the identifying, the distributing, the locking, and the granting are performed as part of a test process for the local build.

8. The computer-implemented method of claim 1, further comprising:
generating, by the one or more processors, a merge build of the software application based on code changes submitted locally and based on a master code branch associated with the software application,
wherein the instantiating, the identifying, the distributing, the locking, and the granting are performed as part of a test process for the merge build.

9. The computer-implemented method of claim 1, further comprising:
collecting, by the one or more processors, a plurality of test results associated with the plurality of test sets configured to execute simultaneously in the different parallel threads; and
generating, by the one or more processors, an aggregated test result report by combining the plurality of test results.

10. A computing device, comprising:
one or more processors;
memory storing computer-executable instructions that, when executed by the one or more processors, cause the one or more processors to perform operations comprising:
instantiating a record-locking database associated with a software application;
identifying a plurality of test cases associated with the software application;
distributing individual test cases of the plurality of test cases among a plurality of test sets, wherein
the plurality of test sets corresponds to a plurality of parallel threads; and
simultaneously executing the plurality of test sets via the plurality of parallel threads,
wherein the record-locking database permits different test cases of the plurality of test cases, executing via different parallel threads of the plurality of parallel threads, to simultaneously access different records in the record-locking database.

11. The computing device of claim 10, wherein the plurality of test cases comprises a set of classes, and individual classes of the set of classes comprise one or more methods.

12. The computing device of claim 11, wherein the distributing is performed at a class level.

13. The computing device of claim 11, wherein the distributing is performed at a method level.

14. The computing device of claim 10, wherein the record-locking database is an in-memory database.

15. One or more non-transitory computer-readable media storing computer-executable instructions that, when executed by one or more processors, cause the one or more processors to perform operations, comprising:
instantiating a record-locking database associated with a software application;
identifying a plurality of test cases associated with the software application;
distributing individual test cases of the plurality of test cases among a plurality of test sets,
wherein different test sets of the plurality of test sets are configured to execute simultaneously in different parallel threads;
locking a first record in the record-locking database based on an access attempt by a first test case executing via a first parallel thread; and
granting a second test case access to a second record in the record-locking database while the first record is locked,
wherein the second test case executes, via a second parallel thread, substantially simultaneously with the first test case executing via the first parallel thread.

16. The one or more non-transitory computer-readable media of claim 15, wherein:
the plurality of test cases comprises a set of classes,
individual classes of the set of classes comprise one or more methods, and
the distributing is performed at one or more of a class level or a method level.

17. The one or more non-transitory computer-readable media of claim 15, wherein the operations further comprise:
detecting an attempt by a third test case to access the first record while the first record is locked,
wherein the third test case executes, via a third parallel thread, substantially simultaneously with the first test case executing via the first parallel thread;
determining that the first record is unlocked following the access attempt by the first test case; and
retrying execution of the third test case based on determining that the first record is unlocked.

18. The one or more non-transitory computer-readable media of claim 15, wherein the record-locking database is an in-memory database.

19. The one or more non-transitory computer-readable media of claim 15, wherein the operations further comprise:
generating a new build of the software application based at least in part on code changes,
wherein the instantiating, the identifying, the distributing, the locking, and the granting are performed as part of a test process for the new build.

20. The one or more non-transitory computer-readable media of claim 15, wherein the operations further comprise:
collecting a plurality of test results associated with the plurality of test sets configured to execute simultaneously in the different parallel threads; and
generating an aggregated test result report by combining the plurality of test results.

* * * * *